United States Patent
Santaolalla Gil et al.

(10) Patent No.: US 7,055,882 B2
(45) Date of Patent: Jun. 6, 2006

(54) SUPPORT STRUCTURE FOR AN INTERIOR OVERHEAD CONSOLE OR PANORAMIC ROOFS OF AUTOMOTIVE VEHICLES

(75) Inventors: Joaquin Santaolalla Gil, Burgos (ES); Carlos Herrero Fuente, Burgos (ES); Omar Lugo Rodriguez, Burgos (ES)

(73) Assignee: Grupo Antolin Ingenieria, S.A. (ES)

( * ) Notice: Subject to any disclaimer, the term of this patent is extended or adjusted under 35 U.S.C. 154(b) by 46 days.

(21) Appl. No.: 11/031,377

(22) Filed: Jan. 7, 2005

(65) Prior Publication Data

US 2005/0212319 A1    Sep. 29, 2005

(30) Foreign Application Priority Data

Jan. 8, 2004    (EP)    ..................... 04380003

(51) Int. Cl.
  *B60R 9/04*    (2006.01)

(52) U.S. Cl. ..................... 296/37.7; 296/37.8; 296/210; 296/214; 224/311

(58) Field of Classification Search .............. 296/37.1, 296/37.7, 37.8, 210, 214; 224/311, 546–548
See application file for complete search history.

(56) References Cited

U.S. PATENT DOCUMENTS

| | | | | |
|---|---|---|---|---|
| 4,818,010 A * | 4/1989 | Dillon | ..................... | 296/37.7 |
| 4,844,533 A * | 7/1989 | Dowd et al. | ................ | 296/214 |
| 4,867,498 A * | 9/1989 | Delphia et al. | ............ | 296/37.7 |
| 5,636,891 A * | 6/1997 | Van Order et al. | ........ | 296/37.7 |
| 6,176,536 B1 * | 1/2001 | Miller et al. | ................ | 296/37.7 |
| 6,338,517 B1 * | 1/2002 | Canni et al. | ................ | 296/37.8 |
| 6,575,528 B1 * | 6/2003 | Tiesler et al. | ................ | 296/214 |
| 6,669,260 B1 * | 12/2003 | Clark et al. | ................ | 296/37.8 |
| 6,827,384 B1 * | 12/2004 | Anderson et al. | .......... | 296/37.8 |
| 6,926,333 B1 * | 8/2005 | Sturt | ........................ | 296/37.8 |
| 6,957,839 B1 * | 10/2005 | Tiesler et al. | ............ | 296/24.34 |

* cited by examiner

*Primary Examiner*—D. Glenn Dayoan
*Assistant Examiner*—Greg Blankenship
(74) *Attorney, Agent, or Firm*—Ostrolenk, Faber, Gerb & Soffen, LLP

(57) ABSTRACT

A support structure for an interior overheard console of a roof of an automotive vehicle, comprising one or more elongated trays, opening at one of its larger walls, and which is anchored at its front and rear edges to crosspieces of the roof of the vehicle. The tray defines housings for the assembly of interchangeable compartments therein. There are connections between each tray and the crosspieces. Guides for installation and the fastening of the compartments in the tray.

7 Claims, 6 Drawing Sheets

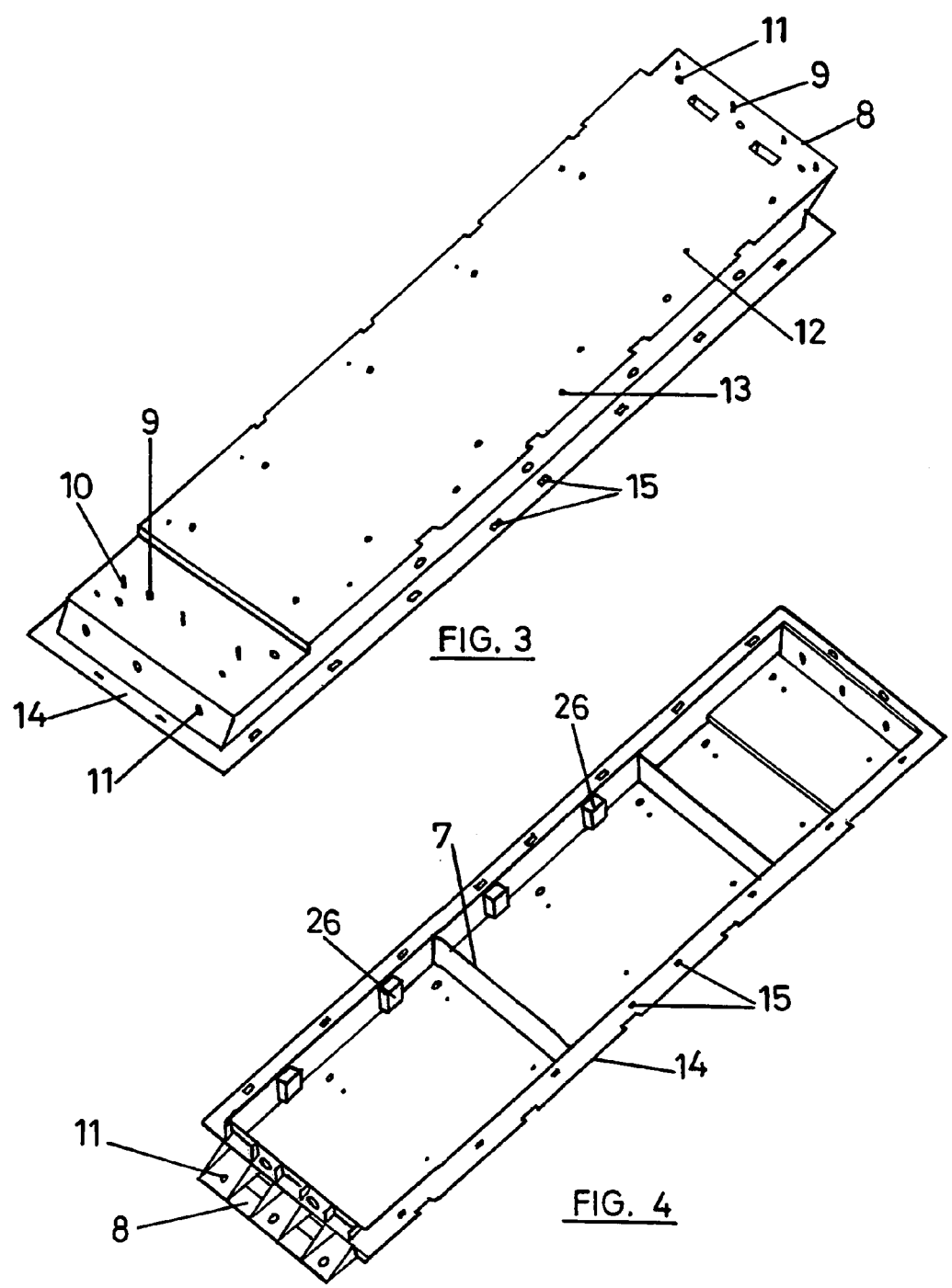

SUPPORT STRUCTURE FOR AN INTERIOR OVERHEAD CONSOLE OR PANORAMIC ROOFS OF AUTOMOTIVE VEHICLES

BACKGROUND OF THE INVENTION

The present invention refers to a support structure for an interior overhead console of a panoramic roof of an automotive vehicle, constructed such that it allows safe assembly of the console, as well as including an arrangement of interchangeable compartments.

Overhead consoles of vehicles constitute the means for arranging different accessories, such as lights, switches, speakers, etc., for services for the compartment or interior in which the console is arranged.

The assembly of these consoles on the trim of the roof is known. This system requires a special design of the trim, since it must support not only the weight of the console, but also the stresses which may be exerted on it when actuating certain accessories assembled thereon. In this sense, U.S. Pat. Nos. 6,575,528 and 6,338,517 disclose adding a structural element to the trim of the roof for anchoring the console modules. In the same sense, Japanese patents JP 001130327, JP 11192892 and JP 08150880 disclose a console which is provided with an anchoring and reinforcement plate, but where the trim supports the weight and stresses exerted on the console.

Fixing the console to some structural element of the vehicle is also known. In this sense, U.S. Pat. No. 5,062,559 discloses a console which is anchored to a closed roof. The entire console constitutes an independent module in the trim, which makes accessibility to it difficult. For panoramic roofs, anchoring the console to the roof and frame is known, as disclosed in U.S. Pat. No. 6,065,793, where the console is not covered by the trim.

SUMMARY OF THE INVENTION

The object of the present invention is a support structure for an interior overhead console of an automotive vehicle, constructed such that its anchoring is positioned on the resistant elements of the vehicle roof, and such that the trim not only undergoes no stress coming from the console, but that the trim is even partially supported by the console.

Another object of the invention is to develop a structure allowing the interchangeability of its components or elements.

A further object of the invention is to provide a console assembly system, which may hide the structural components of the roof and the structure by which the console is assembled.

These and other objectives are obtained with the structure of the invention, which comprises independent elongate trays, one or more trays, which are open at one of their larger side walls and are anchored to the crosspieces of the vehicle roof. The trays define housings for the assembly of interchangeable compartments.

The trays are provided on their smaller walls with coupling elements for coupling onto the crosspiece, and these walls and the bottom have holes for the passage of pre-assembly and fixing elements for fixing the trays to the crosspieces.

The purpose of pre-assembly elements is to place the part in its final position by correct positioning and non-permanent anchoring, facilitating the task of fixing the part. The pre-assembly elements can vary: e.g., centering devices, clips, tabs, etc. One combination for the tray described includes centering devices and clips.

The purpose of the fixing elements is to permanently anchor the part in its final position. The fixing elements can be: screws, clips, adhesives, rivets, etc. Screws are included as the fixing elements for the tray described.

The trays are arranged with their open wall toward the interior of the vehicle. They are finished with an outer flange on which a decorative frame is fixed. Between that frame and the flange, the trim of the roof is retained, such that the structure of the invention, through this frame, serves as a retention element and partially as a support element for the trim of the roof, without transmitting to the roof any action or effect due to the weight of the structure itself and the console, nor due to actions or manipulations which may be performed on the console.

The construction set forth allows the interchangeability of the compartments which are assembled in the trays and which will receive and hold the different accessories.

On the other hand, tray assembly and removal can be performed from the interior of the vehicle, since fixing the trays to the crosspieces is accomplished using easily accessible screws. These trays are completely hidden by the compartments carrying the accessories and by the decorative frame, and partially by the trim of the roof of the vehicle.

Fastening the compartments is also accomplished using screws which can be operated from the interior of the vehicle, such that the interchangeability of such compartments can be carried out even by the user of the vehicle.

The trays are preferably constructed of a light metal alloy and can have an approximately rectangular right prismatic configuration, which is open at one of their larger walls. The number of trays making up the structure may vary, depending on the vehicle type.

Each tray rests on the crosspieces between which the trays are arranged through the bottom of one of its ends and also through the adjacent smaller wall. The support areas are provided with holes which face holes of the crosspieces for the passage of centering devices, fastening clips and lock-screws.

Due to its special constitution and the manner of assembling the trays, the structure of the invention allows anchoring interchangeable compartments, even those having different configurations, assembling and removing these compartments from the interior of the vehicle, as previously indicated. For this purpose, the trays are provided with anchorings or metal inserts for fastening the compartments.

All the features and advantages set forth, as well as others pertinent to the invention, will be clearly shown with the following description, with the aid of the attached drawings which show one non-limiting embodiment.

Other features and advantages of the present invention will become apparent from the following description of the invention which refers to the accompanying drawings.

BRIEF DESCRIPTION OF THE DRAWINGS

FIG. 3 shows an exterior perspective view of one of the trays forming part of the structure of FIG. 1.

FIG. 4 shows a lower perspective view of the tray of FIG. 3.

DESCRIPTION OF A PREFERRED EMBODIMENT

Figure 1:
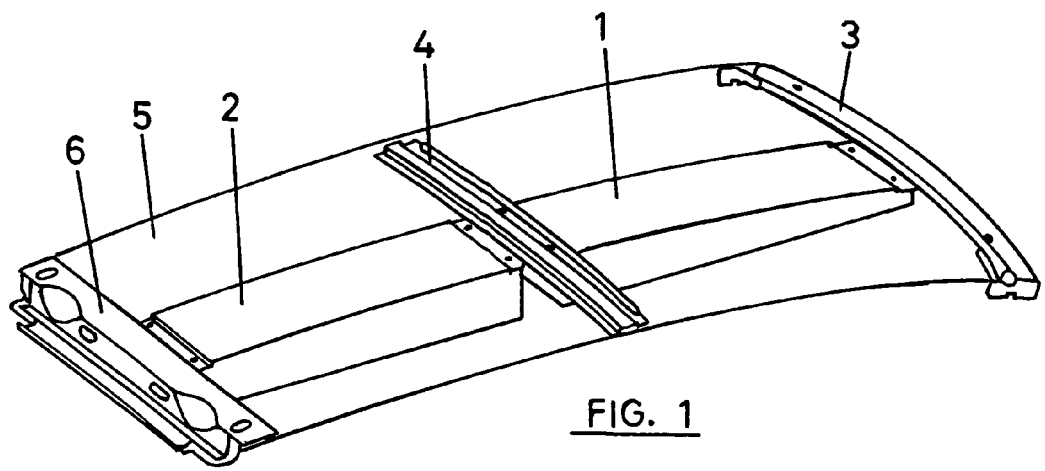
FIG. 1 shows a schematic exterior perspective view of a structure according to the invention and shown as comprised of two trays, assembled on the interior of an automotive vehicle roof.
Figure 2:
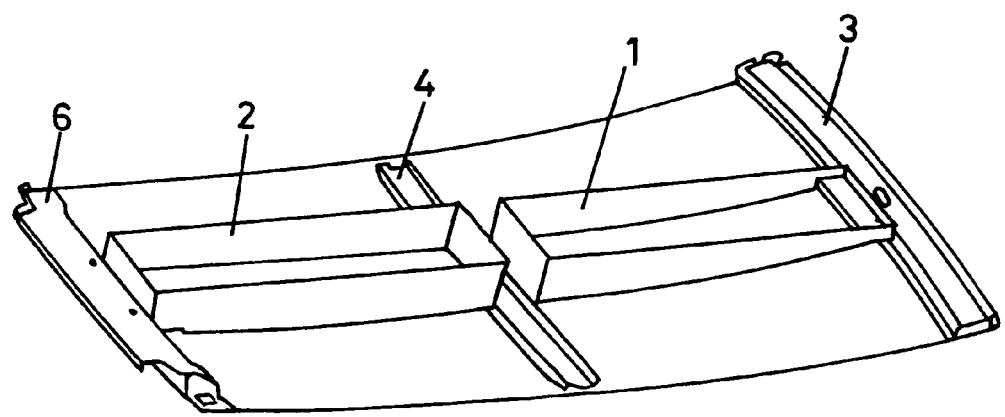
FIG. 2 shows an interior perspective view of the assembly of FIG. 1, shown in an inverted position.

The support structure of the console shown in the drawings, as can best be seen in FIGS. 1 and 2, comprises two trays, 1 and 2, formed of a light metal alloy material, which are open at one of their larger walls, i.e., the one which is facing the interior of the vehicle. The front tray 1 is assembled between a front crosspiece 3 and an intermediate crosspiece 4 of the roof 5 of the vehicle, whereas the rear tray 2 is assembled between the intermediate crosspiece 4 and a rear crosspiece 6.

As can be seen in FIGS. 3 and 4, these trays have an overall right rectangular prismatic configuration, open at one of the walls or the base (FIG. 4) and may include intermediate reinforcement partitions 7 across the narrow widths, and a flange or tabs 8 projecting out from one of the shorter walls, which are designed to rest on the intermediate crosspiece 4, as explained below.

The trays 1 and 2 are aligned in the lengthwise direction of the vehicle. Their quantity can vary depending on the features or dimensions of the vehicle. In the example shown in the drawings, the tray 1 will corresponds to the front half of the vehicle and the tray 2 to the rear half.

The trays 1 and 2 can rest on the crosspieces 4, 5, 6 to which they connect concur through their smaller walls, through the closed bottom or both. These support areas include coupling means or otherwise being shaped for coupling onto the crosspieces, as well as including holes for the passage of centering devices 9 for centering the trays to the crosspiece, tray fastening clips 10 and holes 11 for the passage of lockscrews. The centering devices 9 and clips 10 serve as pre-assembly elements, and the assembly is secured by the lockscrews. The bottom of the trays is also provided with holes 12 for centering interchangeable compartments assembled inside the trays, as explained below, and with holes 13 for the rapid fixing of these compartments.

From the base or open wall, the trays are provided with a peripheral flange 14 including holes 15 therethrough for anchoring a decorative frame, as explained with reference to FIGS. 11 to 13.

Figure 5:
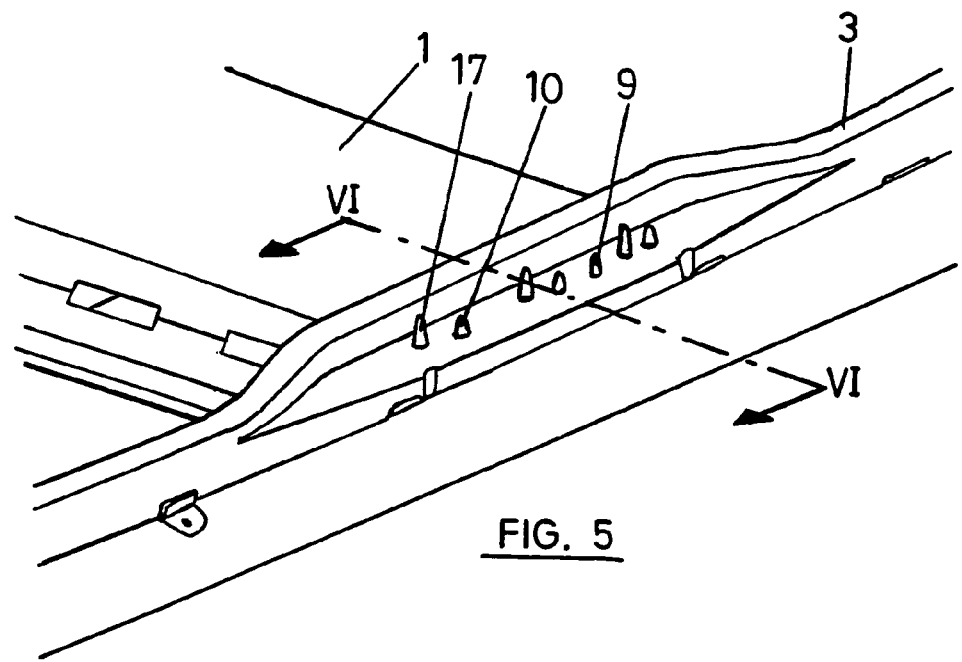
FIG. 5 shows a partial perspective view of the meeting point of one of the trays forming part of the structure of the invention with the front crosspiece of the vehicle roof.
Figure 6:
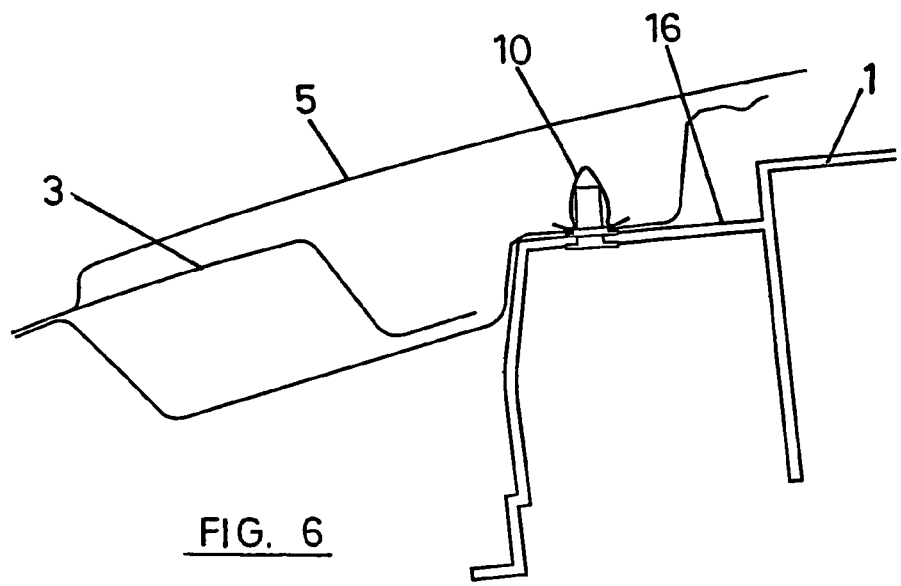
FIG. 6 shows a sectional view of the meeting point of one of the trays with the front crosspiece, taken along cut line VI—VI of FIG. 5.

As seen in FIGS. 5 to 6, at the meeting point between the tray 1 and the crosspiece 3, the tray is coupled onto the crosspiece by a transverse shaping or step 16 of the tray, although in any case the tray 1 lacks such shaping or it has a different shaping adopted according to the shape of the area of the crosspiece 3 on which it rests and to which it is coupled. FIG. 5 shows one of the centering devices 9, fastening clips 10 and lockscrews 17 for fixing the tray to the crosspiece. FIG. 6 shows one of the fastening clips 10. The remaining components are hidden in this view.

Figure 7:
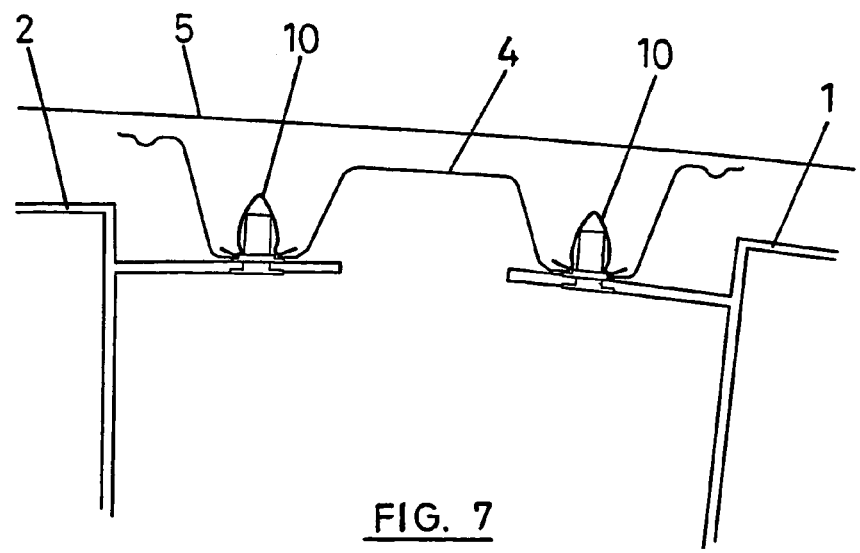
FIG. 7 shows a cross sectional view of the central or intermediate crosspiece on which two of the trays of the structure concur and are connected.

FIG. 7 shows two fastening clips 10 for fastening the front trays 1 and rear trays 2 to the central or intermediate crosspiece 4.

Figure 8:
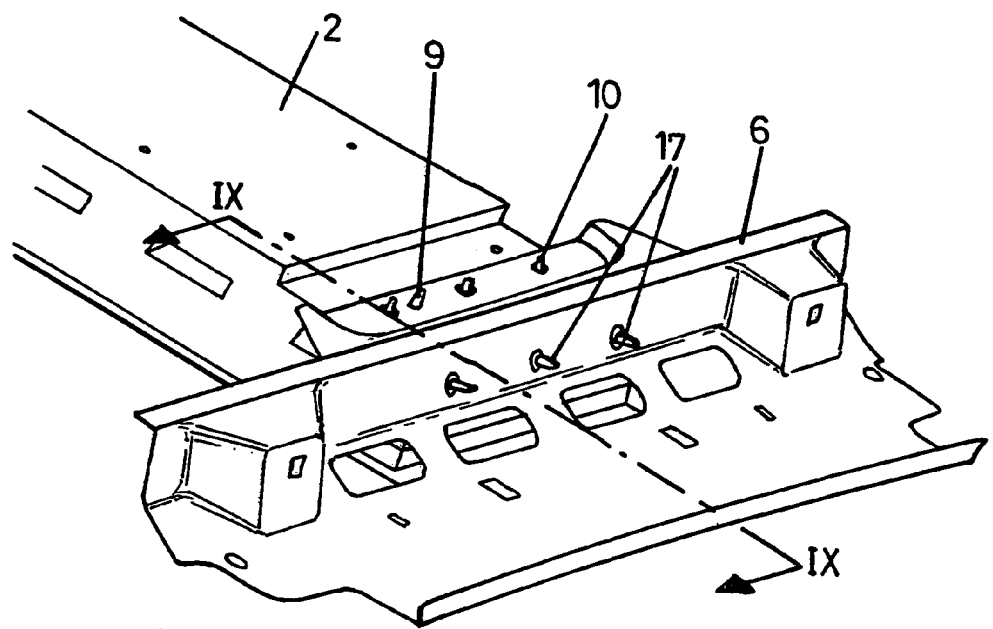
FIG. 8 shows a partial perspective view of the meeting point between one of the trays forming the structure and the rear crosspiece.
Figure 9:
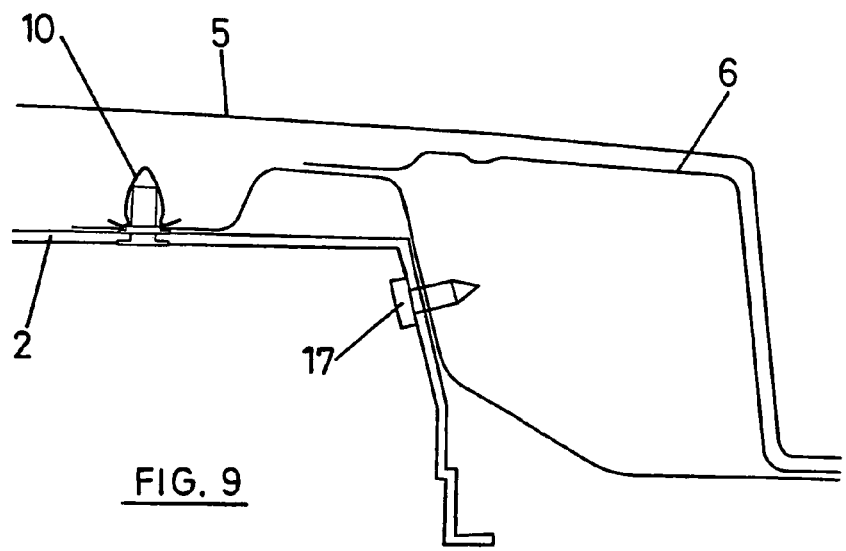
FIG. 9 shows a sectional view of the meeting point between one of the trays forming the structure and the rear crosspiece taken along the IX—IX cut line of FIG. 8.

FIGS. 8 and 9 show the meeting and fixing point where the tray 2 is fixed to the rear crosspiece 6. FIG. 8 shows the centering device 9 for centering the tray 2 to the crosspiece 6, the fastening clips 10 and lockscrews 17. FIG. 9 shows one of the fastening clips 10 and one of the lockscrews 17 for fixing the tray 2 to the crosspiece 6, these being self-tapping screws.

Figure 13:
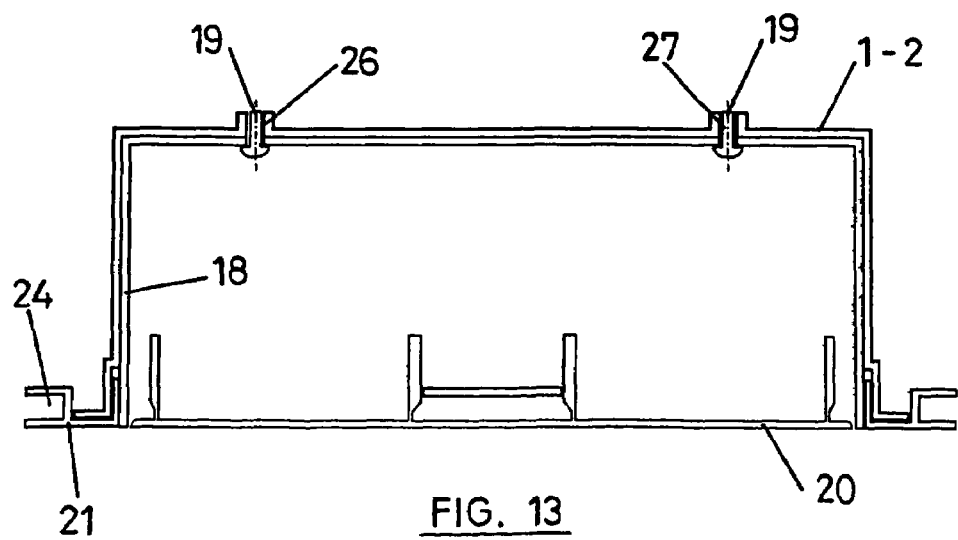
FIG. 13 shows a schematic cross sectional view of one of the trays forming the structure of the invention with a compartment assembled inside it.

Once the trays 1 and 2 are assembled on the crosspieces, the interchangeable compartments 18 are placed therein and fastened by the holes 13 of the trays, FIG. 2, for example with the aid of screws 19, FIG. 13. The interchangeable compartments 18 are closed by means of a cover 20.

Figure 11:
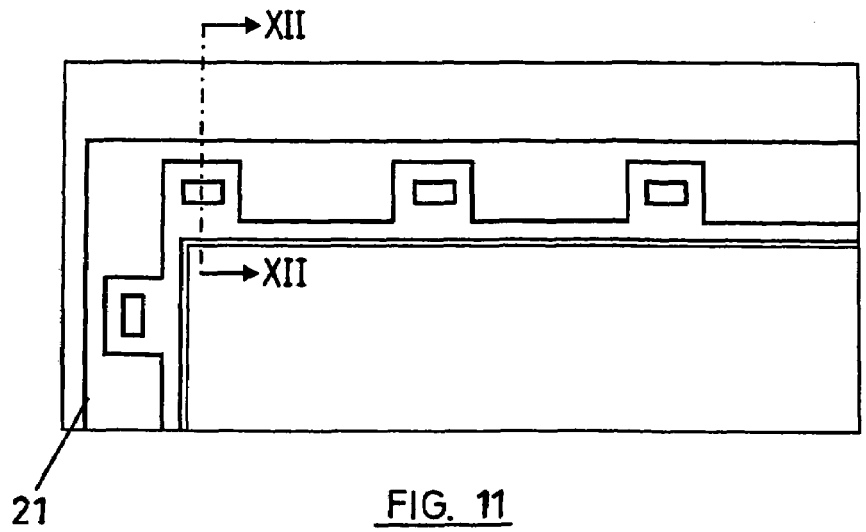
FIG. 11 shows a plan view of a detail of the connection area for connecting the trays forming the structure of the invention with the trim by means of the decorative frame.
Figure 12:
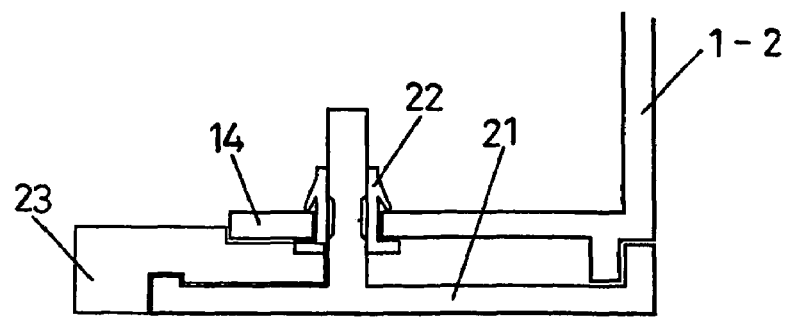
FIG. 12 shows a sectional view of the connection area for connecting the trays to the trim, taken along the XII—XII cut line of FIG. 11.

A decorative frame 21 is arranged around the trays, which frame, as seen in FIGS. 11 and 12, is fixed to the peripheral flange 14 of the trays by means of clips 22 introduced through the holes 15 of the peripheral flange. The trim 23 of the roof can be partially introduced between the frame 21 and the peripheral flange 14.

In the embodiment in FIG. 13, the frame 21 forms a peripheral groove 24 in which the trim 23 can be introduced.

The assembly of compartments 18 occupying the trays 1 and 2 form the overhead console of the vehicle.

The opening of the cover 20 of the interchangeable compartments can be carried out by any system, for example by means of a button or push-button forming part of the trays 1 and 2 themselves. Furthermore, the trays 1 and 2 can be provided on their internal surface, as seen in FIG. 4, with guides 26 ensuring correct positioning of the compartments in the trays.

For the purpose of allowing assembly and removal of the interchangeable compartments without damaging the structure of the trays 1 and 2, the lockscrews 19 of the compartments will not be fixed directly to the tray, but rather to metal inserts 27.

As indicated, the shapings of the trays in the coupling areas for coupling onto the crosspieces, as well as the existence or not of flanges for such a purpose, will depend on the shape of the crosspiece in the areas which the trays must be fixed on.

Figure 10:
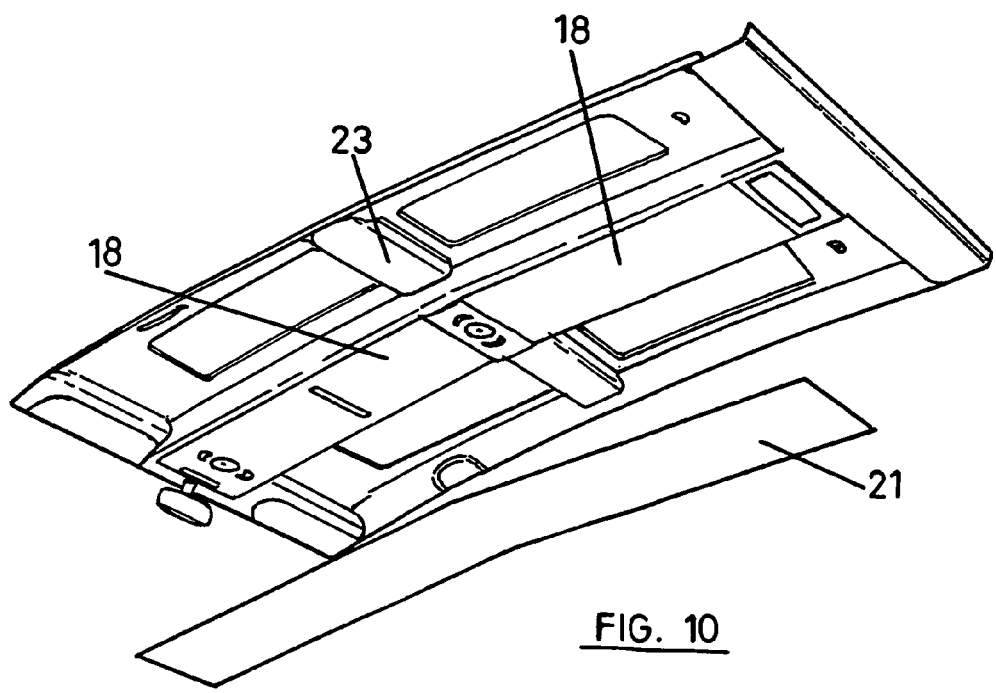
FIG. 10 shows an interior perspective view of the console and trim, with the decorative frame thereof.

As can be seen in FIG. 10, the structure of the invention is specially designed for its application in panoramic roofs of vehicles.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A support structure for an interior overhead console of a panoramic roof of an automotive vehicle comprising:

crosspieces of the roof of the vehicle spaced at intervals from the front to the rear of the roof;

one or more elongated trays each defined by smaller and larger walls and being open at one of the larger walls, the trays defining respective housings therein for the assembly therein of interchangeable compartments;

the smaller walls of the tray have an exterior and the exterior includes external shapings for being coupled onto the crosspieces of the roof, holes in the external shapings for the passage of pre-assembled and fixing elements for fixing the trays to the crosspieces;

each tray further including an outer flange and a decorative frame arranged and fixed to the outer flange, the frame and the flange being shaped and positioned such that trim of the roof is retained between the frame and the flange.

2. A structure according to claim 1, comprising two of the trays and a respective crosspiece at the front and the rear of each tray and to which the tray is coupled.

3. A structure according to claim 1, wherein the trays are comprised of a light metal alloy.

4. A structure according to claim 1, wherein the crosspieces have inward holes therein, each tray rests on the respective cross pieces between which the tray is arranged through the bottom and the adjacent smaller walls of the tray, each tray has areas with first holes which face the inward holes of the crosspieces and the first and inward holes being aligned for enabling the passage of the pre-assembly and fixing elements.

5. A structure according to claim 4, further comprising the pre-assembly and fixing elements including centering devices, fastening clips and lockscrews.

6. A structure according to claim 1, further comprising anchoring or metal inserts in the tray for fastening the compartments in the tray, for allowing the assembly and removal of the compartments form the interior of the vehicle.

7. A structure according to claim 6, wherein the tray includes guides on the walls thereof for positioning the compartments, and the tray has a bottom with holes for inserts into which lockscrews for fastening the compartments are screwed.

* * * * *